March 8, 1927. 1,620,492
E. L. SCHELLENS ET AL
SPRING SUPPORT
Original Filed Feb. 1, 1924  2 Sheets-Sheet 1
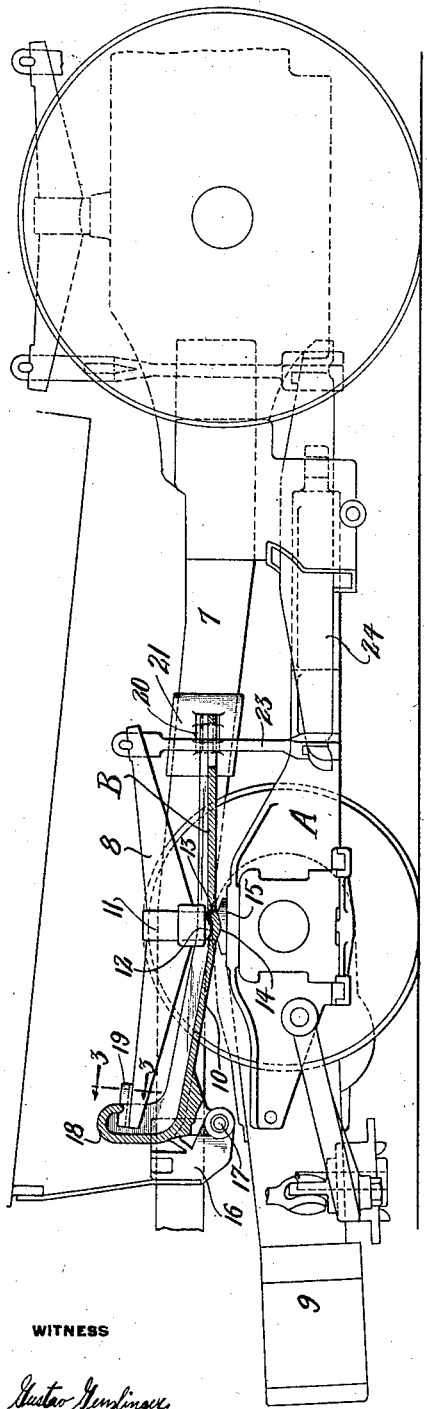
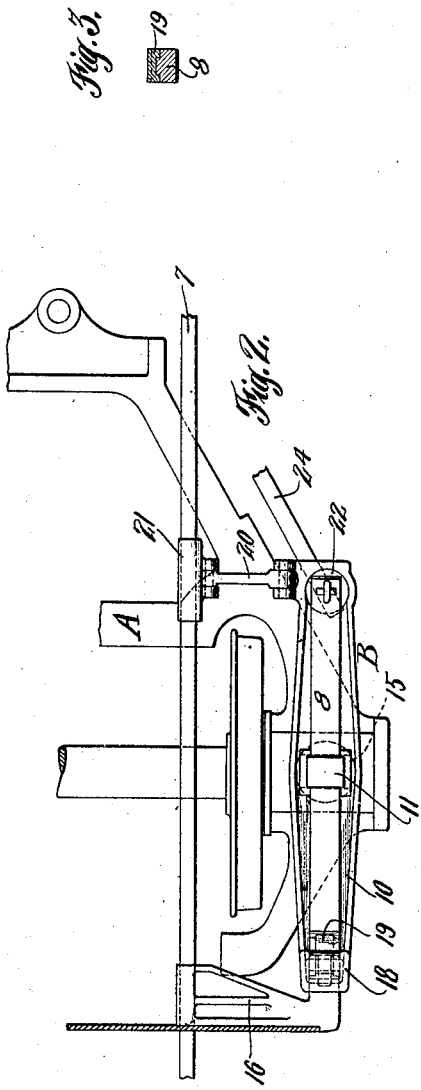

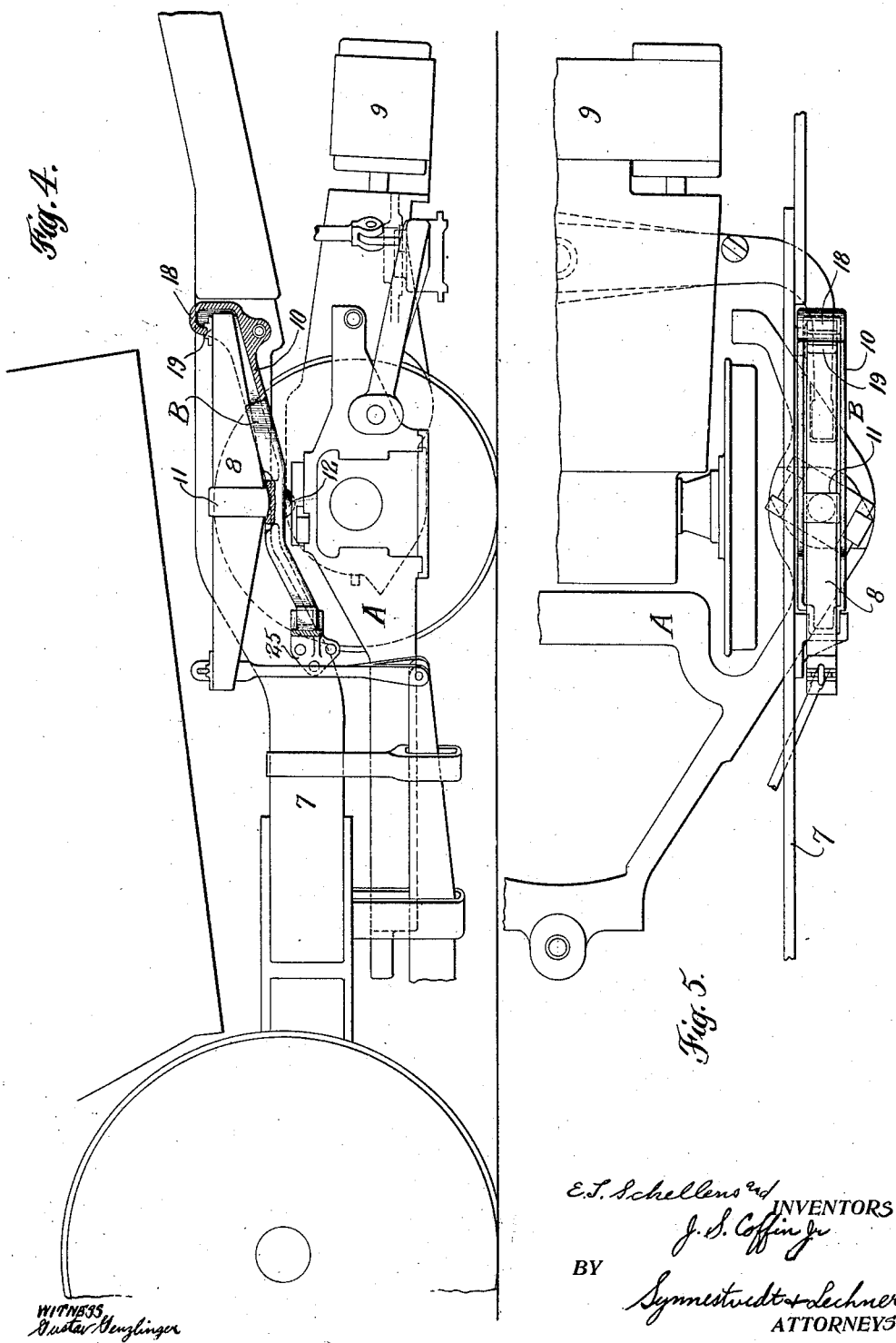

Patented Mar. 8, 1927.

1,620,492

UNITED STATES PATENT OFFICE.

EUGENE L. SCHELLENS, OF POINTE CLAIRE, QUEBEC, CANADA, AND JOEL S. COFFIN, JR., OF LISBON, NEW HAMPSHIRE, ASSIGNORS, BY DIRECT AND MESNE ASSIGNMENTS, TO C-S ENGINEERING COMPANY, A CORPORATION OF DELAWARE.

SPRING SUPPORT.

Application filed February 1, 1924, Serial No. 689,931. Renewed August 16, 1926.

This invention relates to spring supports for railway vehicles and is especially useful in connection with the trailing trucks of locomotives.

One of the primary objects of our invention is to provide a simple and effective means for supporting the spring against lateral displacement and preventing distortion thereof during curving, while at the same time permitting relative vertical movement between the main frame of the locomotive and the truck.

The foregoing together with such other objects as may hereinafter appear or are incident to our invention, we obtain by means of a construction which we have illustrated in preferred form in the accompanying drawings wherein—

Fig. 1 is a diagrammatic side elevation of a trailing truck and a portion of the locomotive with our improved spring support shown in cross section;

Fig. 2 is a plan view of one-half of the trailing truck shown in Fig. 1 illustrating the manner in which the spring support is connected to the main frame;

Fig. 3 is a section taken on the line 3—3 of Fig. 1; and Figs. 4 and 5 are respectively a side elevation and plan view illustrating a modification of our invention.

Referring now to Fig. 1, the reference numeral 7 indicates the rear extension of the main frame of the locomotive to which the trailing truck A is pivoted in the usual manner, weight being transmitted to the truck from the locomotive superstructure through the medium of the springs 8 (of which, of course, there is one on each side) and the usual equalizing mechanism; and the reference numeral 9 designates a booster motor for driving the axle of the trailing truck. A spring support B is interposed between each spring and the truck, and this support in general comprises a channel shaped body portion 10 wider in the middle than at the end. The spring clip 11 has a ball-like portion 12 adapted to seat in a ball-like cavity 13 in the upper surface of the spring support. The lower face of the spring support immediately below the seat 13 is cylindrical, as indicated at 14, and seats in a transverse cylindrical seat formed in the upper face of the pad or shoe 15, resting on top of the truck frame. The cylindrical portion 14 is of the full width of the support.

At the rear end each spring support is pivoted to a bracket 16 secured to the main frame, the pivot pin 17 being disposed in a substantially horizontal plane with its axis transverse the locomotive. The rear end of the support is carried upwardly in the form of a hook 18 which seats on the shoe 19 slidable on the rear end of the spring.

At its forward end the spring support is secured to the main frame by means of the link 20 and the bracket 21, the link being pivoted to both the spring support and the bracket through the medium of horizontally disposed pivots, the axes of which are longitudinal of the locomotive. The forward end of the spring support also has an aperture 22 through which the equalizer hanger 23 passes, such hanger depending from the forward end of the spring and being connected to the equalizing beam 24.

During curving, the truck swings on its pivot point laterally with respect to the main frame, but the bracket 16 and the link 20 support the spring support against lateral displacement relative to the main frame, the spring support in turn preventing lateral displacement and distortion of the spring. As relative vertical motion takes place between the main frame and the truck frame, the rear end of the spring support is carried up or down, as the case may be, and the spring support rocks on the cylindrical seat 14, the forward end of the spring support moving up or down, reversely of the movement of the rear end of the spring support. This is made possible by virtue of the link 20 in so far as the main frame is concerned and by virtue of the ball 12 in so far as the spring is concerned. It will be understood, of course, that the pad or shoe 15 slides on the truck frame as the latter moves laterally during curving. As the spring lengthens or shortens during flexing, the shoe 19 slides on the spring.

It will be seen from the foregoing that the spring is supported against lateral displacement and distortion while at the same time provision is made for relative vertical movement between the main frame and truck. The spring support is caused to rock in a vertical plane by virtue of the fact that the cylindrical portion 14 extends for the full width of the spring support thus providing an extended seating area, preventing tilting. The pivot pin 17 also assists in this respect.

In the construction of Figs. 4 and 5, the same general principles are employed, but in this case the forward end of the spring support is carried downward and is laterally braced by the channel-like bracket 25 secured to the main frame. The end of the support, however, is free to ride up and down as the support rocks. The rear end of the support is carried upwardly. This disposition of the ends of the support prevents tilting and hence the cylindrical portion 14 of the construction first described may be omitted and only the ball 12 provided. The pad 15 is mounted to slide diagonally, at an angle substantially tangent to the circle described in swinging.

We claim:

1. In a railway vehicle, a main frame, a swinging truck, a spring, and a spring support connected to the main frame to afford lateral support for the spring, said support having capacity for rocking movement in a vertical plane on an axis intermediate its ends.

2. In a railway vehicle, a main frame, a swinging truck, a spring, and a spring support, mounted on the truck for rocking movement in a vertical plane on an axis intermediate its ends, and connected to the main frame to afford lateral support for the spring.

3. In a railway vehicle, a main frame, a swinging truck, a spring, and a spring support, mounted on the truck for rocking movement in a vertical plane on an axis intermediate its ends, and pivotally connected at its ends to the main frame.

4. In a railway vehicle, a main frame, a swinging truck, a spring, and a spring support mounted on the truck for rocking movement in a vertical plane and pivotally connected to the main frame at an end in a horizontal plane transverse the vehicle.

5. In a railway vehicle, a main frame, a swinging truck, a spring, a spring support mounted on the truck for rocking movement in a vertical plane and pivotally connected to the main frame at one end in a horizontal plane transverse the vehicle, and a link between the other end of the support and the main frame.

6. In a locomotive, a main frame, a radial truck, a spring, a spring support mounted intermediate its ends for rocking movement in a vertical plane, and means connecting the support to the main frame including a link pivotally connected to the frame and an end of the support and a bracket secured to the frame on which the other end of the support is pivoted in a horizontal plane transverse the locomotive.

In testimony whereof, we have hereunto signed our names.

E. L. SCHELLENS.
J. S. COFFIN, Jr.